US006644354B2

(12) United States Patent
Dinkel et al.

(10) Patent No.: US 6,644,354 B2
(45) Date of Patent: Nov. 11, 2003

(54) HYDRAULIC FLUID ACCUMULATOR

(75) Inventors: Dieter Dinkel, Schwalbach (DE); Axel Hinz, Neu-Anspach (DE); Hans-Dieter Reinartz, Frankfurt (DE); Manfred Rüffer, Sulzbach (DE); Günther Vogel, Dreieich (DE); Uwe Greiff, Bad Homburg (DE); René Lenz, Frankfurt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/257,018

(22) PCT Filed: Apr. 3, 2001

(86) PCT No.: PCT/EP01/03783

§ 371 (c)(1),
(2), (4) Date: Oct. 4, 2002

(87) PCT Pub. No.: WO01/75312

PCT Pub. Date: Oct. 11, 2001

(65) Prior Publication Data

US 2003/0075225 A1 Apr. 24, 2003

(51) Int. Cl.$^7$ ................................ F16L 55/04
(52) U.S. Cl. ................................ 138/30; 138/31
(58) Field of Search ................................ 138/30, 31, 26

(56) References Cited

U.S. PATENT DOCUMENTS

| | | | | |
|---|---|---|---|---|
| 3,015,345 A | | 1/1962 | Michael | 138/31 |
| 3,074,437 A | | 1/1963 | Mercier | 138/31 |
| 4,207,563 A | | 6/1980 | Soupal | 340/626 |
| 4,538,972 A | * | 9/1985 | Gooden | 417/540 |
| 4,691,739 A | * | 9/1987 | Gooden | 138/31 |
| 4,769,990 A | | 9/1988 | Bach et al. | 138/31 |
| 6,286,552 B1 | * | 9/2001 | Shimbori et al. | 138/31 |
| 6,478,051 B1 | * | 11/2002 | Drumm et al. | 138/30 |

FOREIGN PATENT DOCUMENTS

| | | |
|---|---|---|
| DE | 1235692 | 3/1967 |
| DE | 2910554 | 9/1980 |
| DE | 3041185 | 5/1982 |
| DE | 3900899 | 7/1989 |
| DE | 3917797 | 12/1990 |
| DE | 3930557 | 3/1991 |
| DE | 4115342 | 11/1992 |
| DE | 19648168 | 5/1998 |
| DE | 19814835 | 10/1999 |

* cited by examiner

*Primary Examiner*—Patrick Brinson
(74) *Attorney, Agent, or Firm*—Radar, Fishman & Grauer PLLC

(57) ABSTRACT

The present invention discloses a hydraulic fluid accumulator comprising a housing having an interior subdivided into three chambers, with the first chamber being filled with a gas and separated from the second chamber by a first media separation element, the second chamber being filled with a fluid and separated by a second media separation element from the third chamber that is also filled with a fluid and connected to a hydraulic port. To safeguard an effective separation of media within the hydraulic fluid accumulator and, thus, a significant increase in its functional safety, the present invention arranges for the second media separation element to be embodied by a metal piston delimiting a chamber that can be vented in the housing.

7 Claims, 2 Drawing Sheets

HYDRAULIC FLUID ACCUMULATOR

TECHNICAL FIELD

The present invention generally relates to fluid accumulators and more particularly relates to a hydraulic fluid accumulator for brake systems.

BACKGROUND OF THE INVENTION

A hydraulic fluid accumulator of this type is generally disclosed in DE-OS 29 10 554. The first media separation element in the prior art hydraulic fluid accumulator is configured as a metal pleated bellows, while the second media separation element is provided by an elastic partition.

It is disadvantageous in the prior art hydraulic fluid accumulator that an effective separation of media cannot be achieved. Tests have shown that leakage at the pleated bellows that is usually absolutely gas-tight allows the gas to propagate from the first chamber into the second chamber, from there diffusing through the material of the elastic partition into the third chamber. This causes a massive entry of gas into the hydraulic system

BRIEF SUMMARY OF THE INVENTION

Therefore, an object of the present invention is to improve upon a hydraulic fluid accumulator of the type mentioned hereinabove so that the entry of gas into the following hydraulic system is prevented, thereby ensuring a significant increase in the reliability in operation.

According to the present invention, this object is achieved in that the second media separation element is formed of a metal piston delimiting a chamber that is adapted to be vented.

Extremely compact constructions of the subject matter of the present invention are achieved in that the piston is sealed and guided in the housing and embraces the first media separation element in a radial direction and, respectively, that the first chamber is designed between the wall of the housing and the first media separation element and that both the second and the third chamber is provided within the first media separation element.

DETAILED DESCRIPTION OF THE PREFERRED EMBODIMENT

Figure 1:
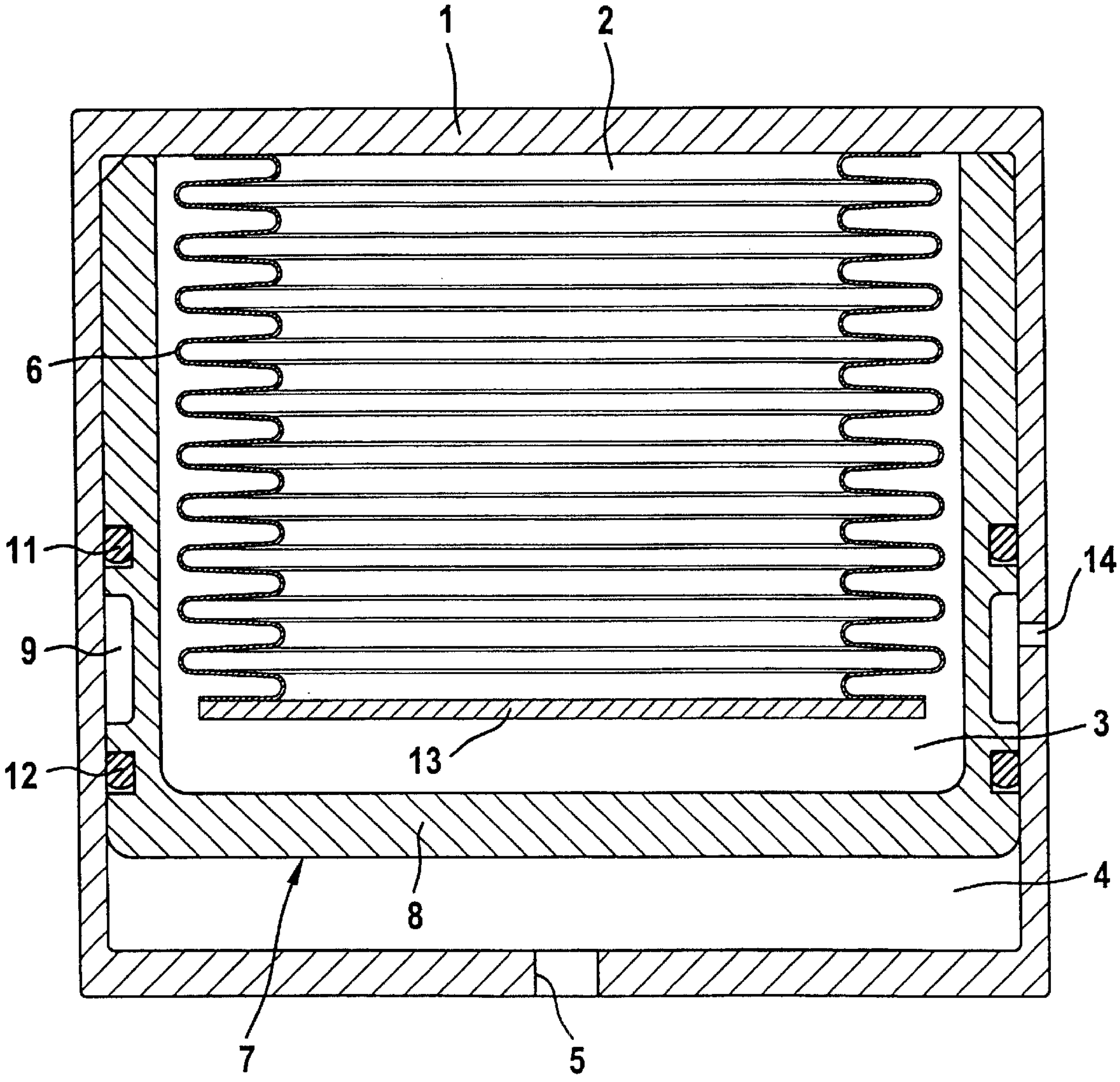
FIG. 1 is an axial sectional view of a first embodiment of the hydraulic fluid accumulator of the present invention.

The first embodiment of the hydraulic fluid accumulator of the present invention as shown in FIG. 1 comprises a housing 1 having an interior that is subdivided into three pressure compartments or chambers 2, 3, 4. The first chamber 2 is formed by the inner space of a first media separation element 6 that is preferably composed of a thin-walled metal pleated bellows being connected pressure-tightly to the housing 1, on the one hand, and closed by a plate 13, on the other hand.

The first chamber 2 can be filled with a gas that is normally under high pressure through a fill port (not shown) arranged in housing 1. A piston 8 preferably made of metal, that is guided in housing 1 so as to be displaceable and encompasses the above-mentioned pleated bellows 6 in a radial direction, confines with the pleated bellows 6 the second chamber 3 and forms a second media separation element designated by reference numeral 7. Incorporated in the bottom part of the housing 1 is the third chamber 4, a hydraulic port 5 opening into said chamber. A radial recess arranged at the periphery of the piston 8 along with the wall of housing 1 defines a compartment 9 which is in communication with the atmosphere by way of bores 14. The compartment 9 is sealed in relation to the second chamber 3 or, respectively, the third chamber 4 by means of each one elastic ring seal 11 or 12, respectively. When brake fluid is used to fill the second chamber 3, it is possible to connect the above-mentioned compartment 9 to a brake fluid reservoir. To reduce the natural leakage at the first-mentioned ring seal 11, it is also possible to use a particularly viscous fluid for filling the second chamber 3, with the said fluid, however, being then discharged into e.g. the atmosphere rather than into the brake fluid reservoir.

Figure 2:
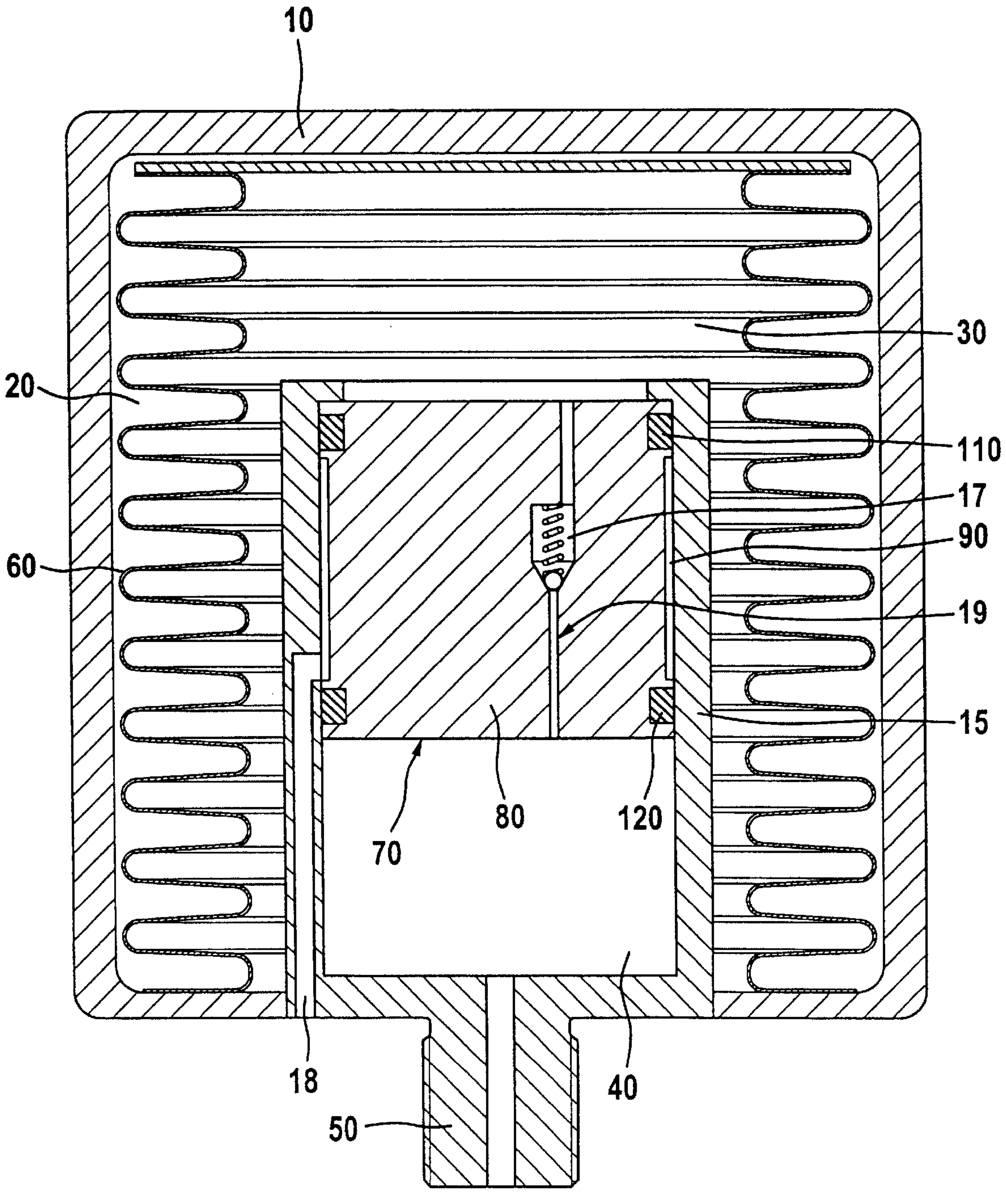
FIG. 2 shows an illustration corresponding to FIG. 1 of a second embodiment of the hydraulic fluid accumulator of the present invention.

In the second embodiment of the subject matter of the present invention illustrated in FIG. 2, the first chamber 20 is not formed by the inner space of the first media separation element 60, as described above, but is delimited between the wall of the housing 10 and the first media separation element or pleated bellows 60. The inner space of the pleated bellows 60 forms the second chamber 30 projecting into which is a cylindrical guide element 15 that is associated with the housing 10, in which the second media separation element 70 or, respectively, the piston 80 is guided and the third chamber 40 is arranged. The compartment 90 mentioned with respect to FIG. 2 and defined between the piston 80 and the cylindrical guide element 15—similar to the embodiment shown in FIG. 1—is sealed in relation to the second chamber 30 and the third chamber 40, respectively, by each one ring seal 110, 120 and connects to the atmosphere by way of a schematically shown channel 18. Further, piston 80 includes a hydraulic connection 19 between the second and the third chamber 30, 40 wherein a non-return valve 17 closing towards the third chamber 40 is inserted. The non-return valve 17 is used to fill and, respectively, replenish separating fluid into the second chamber 30.

What is claimed is:

1. Hydraulic fluid accumulator, comprising;

a housing having an interior subdivided into three chambers, wherein the first chamber is filled with a gas and separated from the second chamber by a first media separation element, wherein the second chamber is filled with a fluid and separated by a second media separation element from the third chamber, wherein the third chamber is also filled with a fluid and connected to a hydraulic port, wherein the second media separation element includes a metal piston delimiting a compartment that is adapted to be vented in the housing wherein the first chamber is arranged between a wall of the housing and the first media separation element, and wherein the second chamber and the third chamber are provided within the first media separation element.

2. Hydraulic fluid accumulator as claimed in claim 1, wherein the first media separation element and the second media separation element are arranged coaxially.

3. Hydraulic fluid accumulator as claimed in claim 1, wherein the metal piston is guided in the housing so as to be displaceable.

4. Hydraulic fluid accumulator as claimed in claim 1, wherein the second chamber is delimited by the first media separation element and by a cylindrical guide member.

5. Hydraulic fluid accumulator as claimed in claim 4, wherein the metal piston includes a hydraulic connection between the second chamber and the third chamber, wherein a non-return valve closing towards the hydraulic port is inserted into said hydraulic connection.

6. Hydraulic fluid accumulator as claimed in claim 1, wherein the vented compartment is sealed in relation to the second and the third chambers by means of two elastic, ring seals.

7. Hydraulic fluid accumulator, comprising:

a housing having an interior subdivided into three chambers, wherein the first chamber is filled with a gas and separated from the second chamber by a first media separation element, wherein the second chamber is filled with a fluid and separated by a second media separation element from the third chamber, wherein the third chamber is also filled with a fluid and connected to a hydraulic port, wherein the second media separation element includes a metal piston delimiting a compartment that is adapted to be vented in the housing wherein the vented compartment is scaled in relation to the second and the third chambers by means of two elastic, ring seals.

* * * * *

UNITED STATES PATENT AND TRADEMARK OFFICE

CERTIFICATE OF CORRECTION

PATENT NO. : 6,644,354 B2

DATED : November 11, 2003

INVENTOR(S) : Dieter Dinkel et al.

It is certified that error appears in the above-identified patent and that said Letters Patent is hereby corrected as shown below:

Column 2,
Line 62, please change "displaceable." to -- displaceable and sealed. --

Column 4,
Line 7, please change "is scaled" to -- is sealed --.

Signed and Sealed this

First Day of June, 2004

JON W. DUDAS

*Acting Director of the United States Patent and Trademark Office*